(12) United States Patent
Suzuki

(10) Patent No.: US 7,492,284 B2
(45) Date of Patent: Feb. 17, 2009

(54) METHOD AND SYSTEM FOR ACQUIRING ADDITIONAL INFORMATION OF MAP INFORMATION

(75) Inventor: Hirotake Suzuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/517,496

(22) Filed: Sep. 7, 2006

(65) Prior Publication Data

US 2007/0052552 A1    Mar. 8, 2007

(30) Foreign Application Priority Data

Sep. 7, 2005    (CA) .................................... 2518482

(51) Int. Cl.
*G08G 1/123* (2006.01)
*G01C 21/00* (2006.01)

(52) U.S. Cl. .................................. 340/995.27; 701/201
(58) Field of Classification Search . 340/995.1–995.28, 340/988, 990, 991, 428, 450.2; 701/201–226
See application file for complete search history.

(56) References Cited

U.S. PATENT DOCUMENTS 6,078,850 A * 6/2000 Kane et al. .................... 701/29
6,591,185 B1 * 7/2003 Polidi et al. ................. 701/201

FOREIGN PATENT DOCUMENTS

| JP | PUPA11-051666 | 2/1999 |
|---|---|---|
| JP | 2000-46573 | 2/2000 |
| JP | 2000039328 A | 2/2000 |
| JP | 2000131116 A | 5/2000 |
| JP | 2001174272 A | 6/2001 |
| JP | PUPA2001-241965 | 7/2001 |
| JP | 2002108203 A | 4/2002 |
| JP | 2002148051 A | 5/2002 |
| JP | PUPA2002-196665 | 7/2002 |
| JP | PUPA2002-251432 | 9/2002 |
| JP | 2003021522 A | 1/2003 |
| JP | 2003-294458 | 10/2003 |
| JP | PUPA2004-061247 | 2/2004 |
| JP | 2004-070773 | 3/2004 |

* cited by examiner

*Primary Examiner*—Jeff Hofsass
*Assistant Examiner*—Sigmund Tang
(74) *Attorney, Agent, or Firm*—Schmeiser, Olsen & Watts; William H. Steinberg

(57) ABSTRACT

A method for obtaining additional information pertaining to a route along which a vehicle is traveling from a current location to a destination. Location information of the vehicle, which includes the current location, is acquired by an in-vehicle computer within the vehicle. The in-vehicle computer transmits to a server via a network: the location information, movable range information, and selection criteria information. A movable range derivable from the movable range information is an area relative to the current location in which the vehicle can travel from the current location by using a remaining amount of fuel in the vehicle when the vehicle is at the current location. A limited range with respect to the route is a function of the location information, the movable range information, and the selection criteria information. The in-vehicle computer receives, from the server, additional information limited to information concerning locations within the limited range.

20 Claims, 7 Drawing Sheets

METHOD AND SYSTEM FOR ACQUIRING ADDITIONAL INFORMATION OF MAP INFORMATION

FIELD OF THE INVENTION

The present invention relates to a method and system for acquiring additional information of map information from a server system being connected via a network, and further relates to a method and a system for providing additional information of map information.

BACKGROUND OF THE INVENTION

In recent years, a computer which can be installed in a vehicle such as a car navigation system using a GPS (Global Positioning System), an in-vehicle PC (hereinafter, referred to as an in-vehicle computer) or the like has become popular as means for routing assistance to a destination. Such an in-vehicle computer provides a driver with routing assistance to a destination by displaying a map based on current location information, and also provides spot information including tourist attractions and gas stations in the areas around the route. Map information and spot information are stored in a storage medium such as a DVD, a HDD or the like. However, since this type of information is frequently subject to changes and thus immediately becomes obsolete, this information needs to be updated along with such changes.

Regarding such updating of information, a car navigation device and a map information providing device are known for being able to obtain updated map information in case that map information is changed. When this car navigation device determines that particular map information is out-of-date, the car navigation device described above can download map information from the map information providing device and update the same.

However, downloading all of map data that become large volumetric produces unnecessary network traffic, and therefore, it takes a long time to acquire the information.

SUMMARY OF THE INVENTION

The present information provides a method for providing additional information pertaining to a route R along which a vehicle is traveling from a current location P to a destination D, said method comprising:

receiving, by a server from an in-vehicle computer via a network, location information of the vehicle, movable range information, and selection criteria information, wherein the in-vehicle computer is positioned within the vehicle, wherein the location information comprises the current location P of the vehicle, wherein a movable range C derivable from the movable range information is an area relative to the current location P in which the vehicle can travel from the current location P by using a remaining amount of fuel in the vehicle when the vehicle is at the current location;

determining a limited range F with respect to the route R, wherein said determining the limited range F comprises utilizing the location information, the movable range information, and the selection criteria, and wherein the selection criteria information constrains the limited range F to be a subset of the movable range C that is less than the movable range C; and transmitting, by the server to the in-vehicle computer, additional information limited to information concerning locations within the limited range F.

The present information provides a method for providing additional information pertaining to a route R along which a vehicle is traveling from a current location P to a destination D, said method comprising:

receiving, by a server from an in-vehicle computer via a network, location information of the vehicle, movable range information, and selection criteria information, wherein the in-vehicle computer is positioned within the vehicle, wherein the location information comprises the current location P of the vehicle, wherein a movable range C derivable from the movable range information is an area relative to the current location P in which the vehicle can travel from the current location P by using a remaining amount of fuel in the vehicle when the vehicle is at the current location;

determining a limited range F with respect to the route R, wherein said determining the limited range F comprises utilizing the location information, the movable range information, and the selection criteria, and wherein the selection criteria information constrains the limited range F to be a subset of the movable range C that is less than the movable range C; and transmitting, by the server to the in-vehicle computer, additional information limited to information concerning locations within the limited range F.

The present invention enables an in-vehicle computer, which stores map information, to provide the latest additional information of map information in a shorter amount of time and in more just proportion than is provided in the prior art.

DETAILED DESCRIPTION OF THE INVENTION

Figure 1:
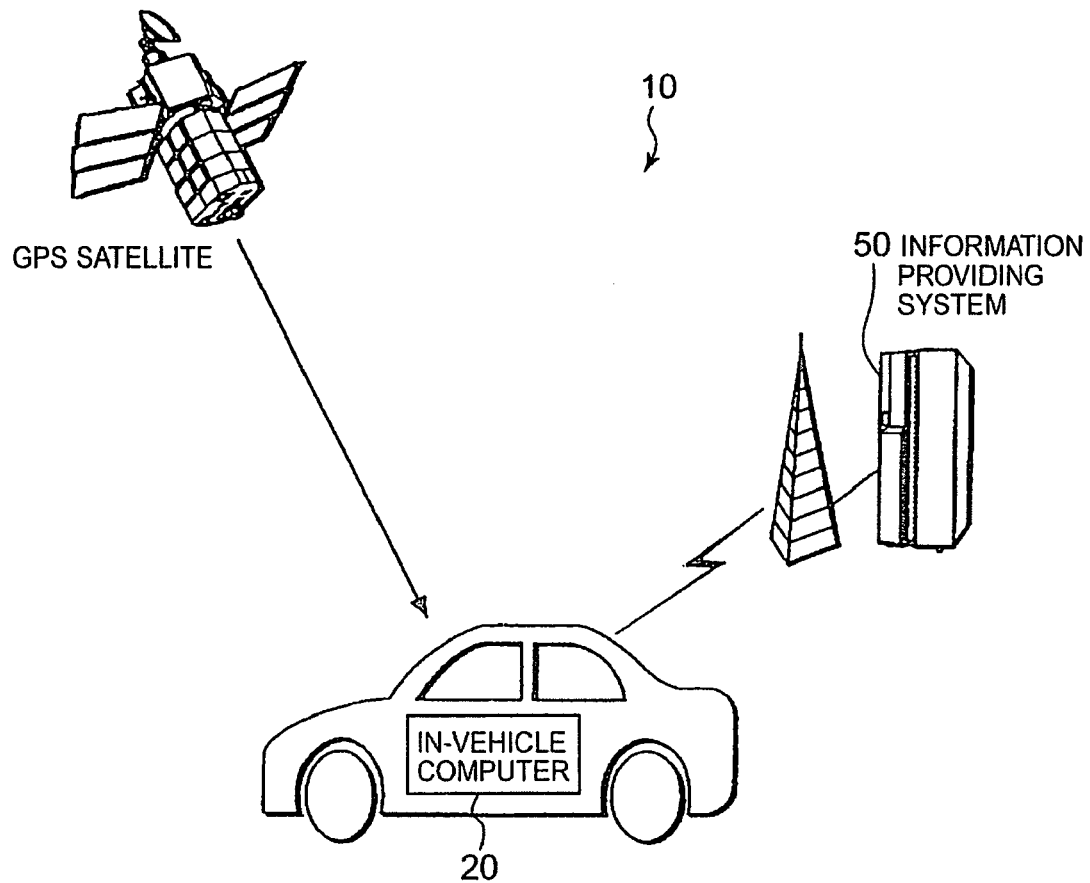
FIG. 1 shows the entire constitution of a main system, in accordance with embodiments of the present invention.

A first mode of the present invention provides, in an in-vehicle computer that stores map information, a method for acquiring additional information of map information from a server system being connected via a network, the method including a step of storing location information of a vehicle, a step of determining a movable range of the vehicle, a step of transmitting information which specifies the movable range of the vehicle to the server system in order to request additional information of map information, and a step of acquiring the additional information of map information within the movable range of the vehicle from the server system, a computer program product for causing a computer to execute the method thereof, and an in-vehicle computer in which the method thereof is used. In addition, in the first mode of the present invention, a server system having a database of additional information of map information provides an in-vehicle computer with additional information of map information by a method comprising a step of acquiring information which specifies a movable range of a vehicle from an in-vehicle computer, a step of selecting additional information of map information within the movable range of the vehicle from the database of additional information of map information based on the acquired information which specifies the movable range, and a step of transmitting the selected additional information to the computer.

In the first mode of the present invention, an in-vehicle computer determines a movable range of a vehicle. Having received information which specifies a movable range of a vehicle, a server system selects additional information that is within the movable range of the vehicle and transmits the same to the in-vehicle computer. Narrowing down information to be acquired enables decreasing a data transfer amount in acquiring additional information. Further, a movable range of a vehicle is determined based on location information of the vehicle.

Also, additional information of map information to be acquired may be selected based on not only a movable range of a vehicle but also on routing information such as a destination or a route being set in an in-vehicle computer, and a selection criterion such as a user preference (personalized information set by a user), driver information or the like. Moreover, it is also possible to set priorities in these selection criteria of additional information and acquire additional information in accordance with the priorities.

A second mode of the present invention provides, in a server system having a database of additional information of map information, a method for providing additional information of map information to an in-vehicle computer being connected via a network, the method comprising a step of acquiring location information of a vehicle from the in-vehicle computer, a step of determining a movable range of the vehicle based on the location information of the vehicle, a step of selecting additional information of map information within the movable range of the vehicle from the database of the additional information of map information, and a step of transmitting the selected additional information to the computer, and provides a system in which the method thereof is used. In addition, in the second mode, the in-vehicle computer acquires additional information of map information by using a method including a step of storing location information of a vehicle, a step of transmitting the location information of the vehicle to the server system in order to request additional information of map information, and a step of acquiring the additional information of map information within a movable range of the vehicle from the server system.

In this second mode of the present invention, the server system determines a movable range of a vehicle. Having received location information of a vehicle, the server system determines a movable range of the vehicle, and selects additional information within the range in order to transmit the selected additional information to the in-vehicle computer.

FIG. 1 shows the entire construction of a main system 10, in accordance with embodiments of the present invention. The main system 10 includes an in-vehicle computer 20, and an information providing system 50, which are connected to each other via a network 60. The in-vehicle computer 20 is, for example, a car navigation system, which is installed in a vehicle 30 such as an automobile or the like and displays a map based on location information acquired from a GPS satellite 40 to instruct a user a route to a destination. The in-vehicle computer 20 can also display spot information such as tourist attractions and gas stations in relation to the map to be displayed. The information providing system 50 provides the in-vehicle computer 20 with additional information such as the latest map data, spot information or the like.

In one embodiment, a high-speed wireless network may be used for transferring data to the in-vehicle computer 20. For example, a wireless USB or a wireless LAN may be installed in a convenience store or a gas station, and when a user stops at such a place, the in-vehicle computer 20 can obtain the latest information from the information providing system 50 via the wireless network.

Figure 2:
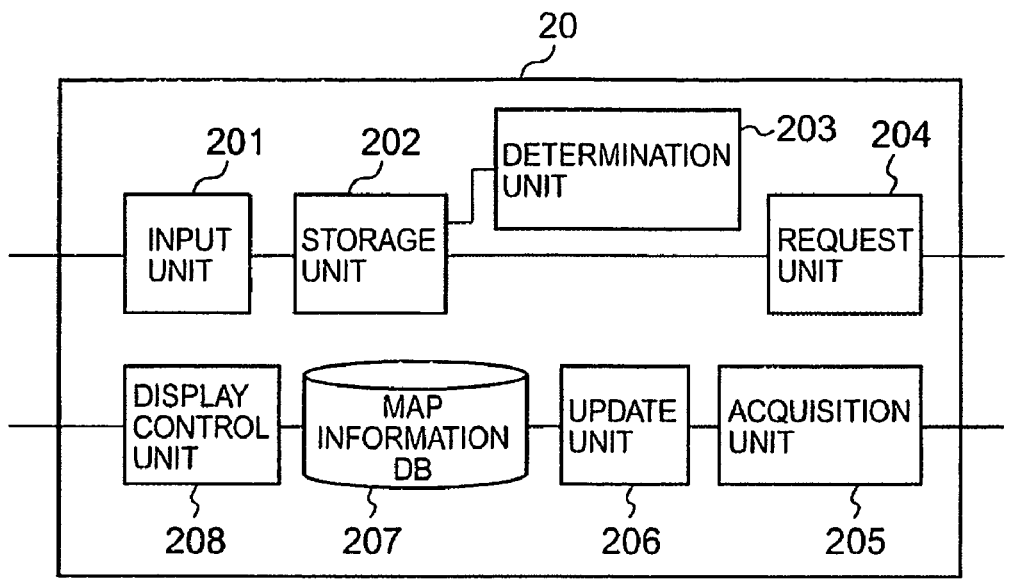
FIG. 2 shows functions of an in-vehicle computer, in a first embodiment of the present invention, categorizing into function blocks.

FIG. 2 shows functions of the in-vehicle computer 20 in a first embodiment of the present invention, categorizing into function blocks. The in-vehicle computer 20 includes an input unit 201, a storage unit 202, a determination unit 203, a request unit 204, an acquisition unit 205, an update unit 206, a map information database 207, and a display control unit 208.

The input unit 201 acquires various types of information including location information indicating a location of a vehicle in which the in-vehicle computer 20 is loaded, remaining fuel information indicating an amount of fuel left in the vehicle, gas mileage information indicating the mileage of the vehicle, and selection criteria for narrowing down additional information of map information to be received from the information providing system 50.

The in-vehicle computer 20 can automatically acquire the location information by an autonomous navigation according to, for example, a GPS, a gyro sensor, or a map matching. Instead, a user may directly input information that can specify a location, such as a postal address, a ZIP code or the like, through the input screen of the in-vehicle computer.

With regard to the remaining fuel information, if the vehicle has a function that provides various kinds of sensing information (a travel distance, a speed, a remaining amount of fuel, and the like) to the in-vehicle computer 20 via an in-vehicle network, the in-vehicle computer 20 can automatically acquire remaining fuel information by utilizing the function. In case that the vehicle does not have such a function, it is possible to make the in-vehicle computer 20 acquire remaining fuel information by allowing a user to input, for example, information on a refueling amount or the like. A gas mileage rate is defined as a distance of travel by vehicle divided by a volume of fuel consumed during the distance of travel by the vehicle. A gas mileage rate (e.g., in units of miles/gal or km/liter) can therefore be calculated by dividing a traveled distance (e.g., in units of miles or kilometers) by the vehicle 30 by a fuel consumption amount (e.g., in units of gallons or liters) corresponding to the traveled distance.

The selection criterion for additional information is for narrowing down additional information of a map which is requested to be transmitted to the information providing system 50. Even if a data transfer amount for receiving additional information of map information is limited to information within a movable range of a vehicle, in case of receiving all of the information, the amount becomes considerably large. In order to complete the reception of the information while a user is shopping or refueling at a convenience store or a gas station that is equipped with a high-speed wireless network, it is necessary to reduce the amount of data. In addition, a user may want to acquire only the type of information in which the user is interested, instead of the entire additional information of map information. Therefore, one embodiment of the present invention establishes a criterion for narrowing down information to be received.

Specifically, a user can establish the following selection criteria in the in-vehicle computer 20: selection with consideration of routing information such as a destination, a route or the like.

Information on areas beyond a destination, information on areas in the opposite direction to the destination from a current location, and information on areas far from the route to the destination (for example, an area that is 3 km or more away from the route) are, in most of the cases, useless for a user, even if those areas are located within the movable range of the vehicle. Therefore, if a user thinks such kinds of information are not necessary, then the user can elect to remove such kinds of information from additional information of map information to be received.

Figure 3:
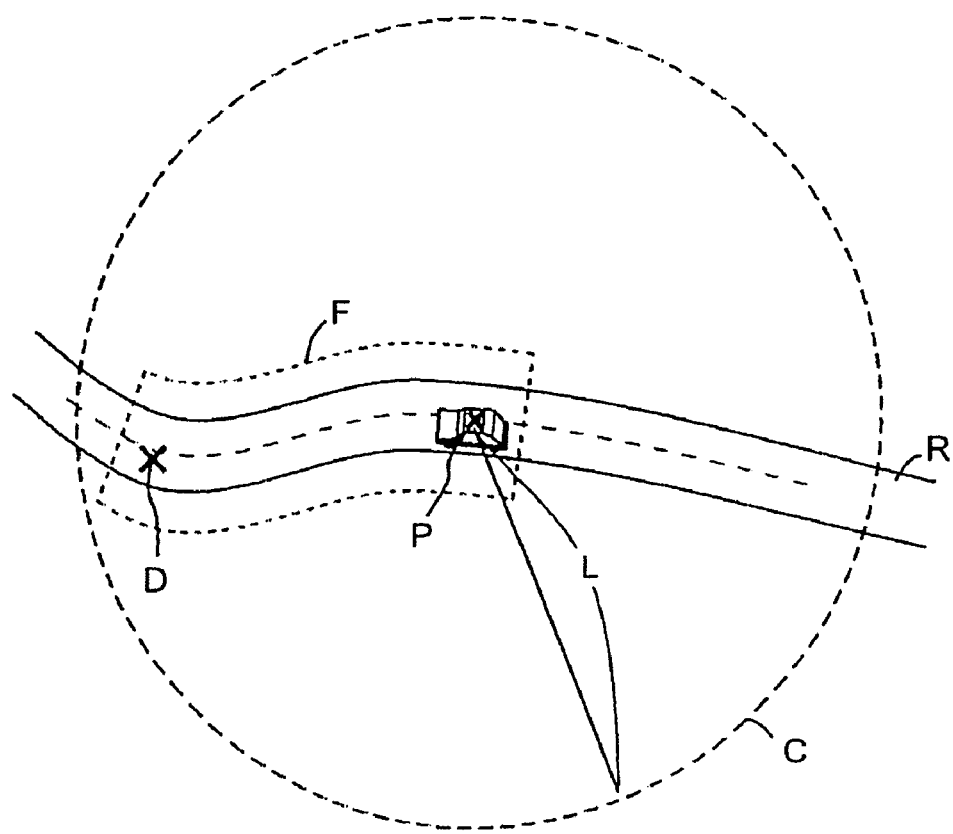
FIG. 3 is a conceptual view showing how information to be acquired based on routing information is narrowed down, in accordance with embodiments of the present invention.

FIG. 3 is a conceptual view showing how information to be downloaded is narrowed down by selection criteria information with consideration of routing information, in accordance with embodiments of the present invention. A vehicle is traveling towards a destination D by way of a route R, and is currently located at a point P. Based on the movable distance L of the vehicle calculated from the remaining amount of fuel, the movable range C of the vehicle 30 is defined as the area inside a circle of the radius L centering on the current location P. By removing information on areas beyond the destination D, information on areas in the opposite direction to the destination, and information on areas being away from the route R to the destination, the in-vehicle computer 20 can acquire only information of locations in a limited range F with respect to the route R. As seen in FIG. 3, the limited range F with respect to the route R is an area within the movable range C that comprises a portion of the route R that is disposed between about the current location P and about the destination D such that the outermost boundaries B of the limited range F are each displaced from the trajectory T of the vehicle 30 along the route D by no more than a maximum distance S, said maximum distance S being determined by the selection criteria information. Thus, the limited range F is a subset of the movable range C that is less than the movable range C; i.e., the limited range F does not include all of the movable range C. In other words, by acquiring the latest map data, spot information or the like being within the limited range F, the in-vehicle computer 20 can display, on a map, a road, a gas station and the like that have been newly constructed within the range F.

A user can elect to display or not to display a selected type of information. A user can elect to receive or not receive information in respective categories for each category of information classified such as, for example, map data, gas stations, convenience stores, restaurants, tourist attractions or the like. Moreover, a user can also elect to receive or not receive information on locations where additional information of map information can be received; i.e., location information of gas stations or convenience stores which are equipped with a high-speed wireless network. This enables a user to acquire new additional information of map information as required. In addition, the present invention further enables a user to perform elections to suit a user's purpose, such as, for example, in case of gas stations, elections to receive information on a brand of the gas station to which the user subscribes, and in case of tourist attractions, elections to receive information on hot spring resorts or sky resorts.

A user can elect one or more selection criteria stated above. Moreover, a user can set priorities in the selection criteria. This causes the in-vehicle computer 20 to acquire additional information of map information in the order of descending priorities. Therefore, even if a user stays at a convenience store or the like equipped with a wireless network for a short time, and thus cannot download entire information to acquire, the in-vehicle computer 20 can acquire high-priority information. Further, the priorities may be determined based on relative criteria, such as high priority, medium priority, and low priority.

Figure 4:
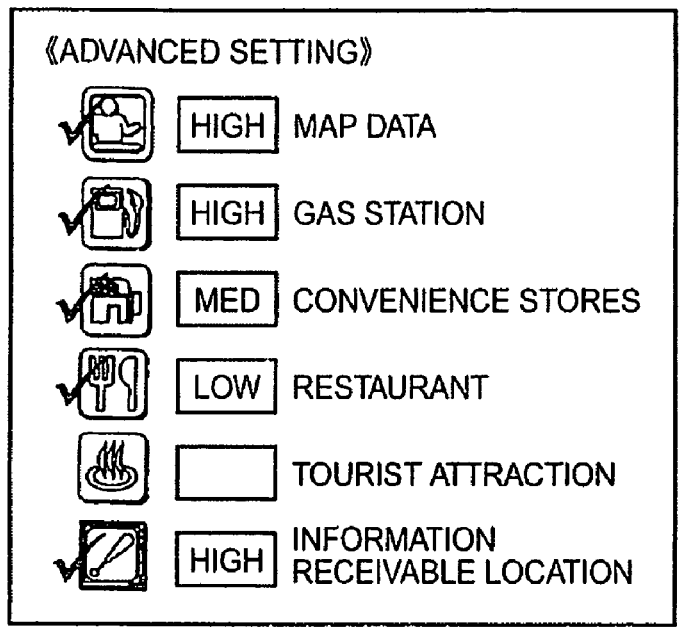
FIG. 4 shows an example of an input screen of additional information selection criteria, in accordance with embodiments of the present invention.

FIG. 4 shows an example of a screen for inputting selection criteria, in accordance with embodiments of the present invention. A user elects to receive an information category that the user wants to acquire from among information categories being displayed and the priority of the information category. In this example, a user elects to acquire additional information on map data, gas stations, convenience stores, restaurants, and information receivable points. Also, the user gives "high" priority to additional information on map data, gas stations, and information receivable points, "medium" priority to information on convenience stores, and "low" priority to information on restaurants, respectively.

Thus in one embodiment, the selection criteria information comprises a plurality of information categories for the additional information and an assigned priority for each category, wherein the additional information is received by the in-vehicle computer 20 in descending order with respect to the assigned priorities (i.e., the additional information for higher priority categories is received before the additional information for lower priority categories is received).

Further, even when the vehicle is used by a plurality of users, each user can perform elections that suits each user's purpose or interest, by giving each user an identifier such as a user ID. For example, in starting use of an in-vehicle computer 20, the user manually inputs the user ID to the in-vehicle computer 20, or makes the in-vehicle computer 20 to read a card or the like in which the user ID is stored, and thereby, the user identifier is inputted into the in-vehicle computer 20. The in-vehicle computer 20 stores the additional information selection criteria being set by a user in association with the user's ID.

By enabling selection of information as above, it is possible to reduce a data transfer amount, and display information that suits each user's need.

The storage unit 202 stores various types of information, such as location information of a vehicle, remaining fuel information of the same, gas mileage information of the same, and selection criteria of additional information of the same, etc. which have been inputted in the input unit 201.

The determination unit 203 determines a movable range of a vehicle based on the location information of the vehicle stored in the storage unit 202. A movable range is a range of a distance that a vehicle can travel, beginning at a current location of the vehicle. In case that remaining fuel information and gas mileage rate information are available, a radial distance L from the current location (e.g. in units of miles or km) can be determined by dividing a remaining amount of fuel (e.g. in units of gallons or liters) by a gas mileage rate (e.g. in units of miles/gal or km/liter). The radial distance L in conjunction with the current location P determines the movable range C (which is the area of the circle defined by the radial distance L) as described supra. In case that remaining fuel information and gas mileage rate information are not available, a given distance from a location of a vehicle (for example, 100 km) may be specified or inputted as a movable range. The determination unit 203 stores the information on the movable range of the vehicle on the storage unit 202.

The request unit 204 takes the movable range information stored in the determination unit 203, and information on the additional information selection criteria (personalized information) from the storage unit 202, and then transmits the movable range information and the additional information to the information providing system 50. In more particular, as for location information, the request unit 204 transmits, to the information providing system 50, information on the latitude and altitude indicating a current position, information on the latitude and altitude indicating a movable range, and information on the azimuth orientation indicating the direction that a vehicle is traveling by 16 divisive azimuth orientations (for example, representing north, east, south and west as to be "00," "04," "08," and "12", respectively) in consideration of a route. In addition, as for the personalized information, the request unit 204 transmits information on the categories of information that a user wants to receive and the priorities thereof to the information providing system 50.

Moreover, at the time of the initial communication with the information providing system 50, the in-vehicle computer 20 transmits a model identification code representing a model or a version thereof to the information providing system 50, and thereby, the information providing system 50 can provide a form of data compatible with the model of the in-vehicle computer 20.

The acquisition unit 205 receives, from the information providing system 50, additional information of map information being selected by the information providing system 50 based on the information being transmitted by the request unit 204.

In response to the fact that the acquisition unit 205 receives additional information of a map from the information providing system 50, the update unit 206 reflects the received information to the map information database 207. This causes the map information database 207 to hold the latest map information with regard to a movable range of a vehicle.

The map information database 207 stores map data and spot information. In order to update map data and spot information, an updatable storage medium such as a DVD or a HDD is used.

The display control unit 208 takes and display map information from the map information database 207 onto the display screen of the in-vehicle computer 20.

Figure 5:
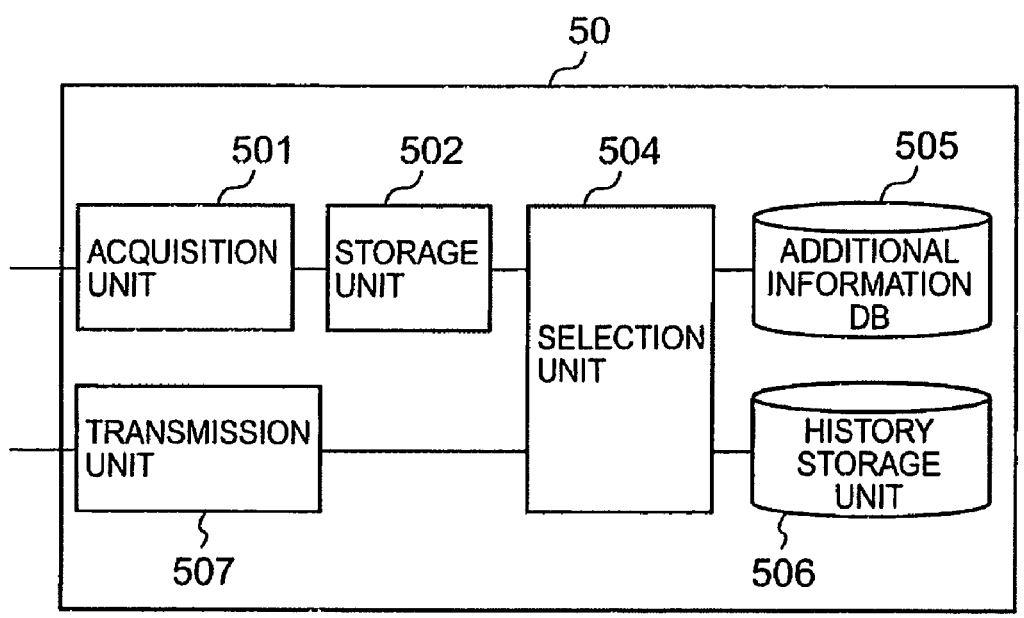
FIG. 5 shows functions of an information providing system in the first embodiment of the present invention, categorizing into function blocks.

FIG. 5 shows functions of the information providing system 50, categorizing into function blocks, in the first embodiment of the present invention. The information providing system 50 includes an acquisition unit 501, a storage unit 502, a selection unit 504, an additional information database 505, a transmission history storage unit 506, and a transmission unit 507.

The acquisition unit 501 acquires movable range information and information on additional information selection criteria that are transmitted from the in-vehicle computer 20.

The storage unit 502 stores the movable range information of a vehicle and the information on additional information selection criteria thereof that are acquired by the acquisition unit 501.

Based on the movable range information and the information on additional information selection criteria that are stored in the storage unit 502, the selection unit 504 selects and takes additional information of map information to be transmitted to the in-vehicle computer 20 from the additional information database 505 which stores map data, spot information such as tourist attractions, restaurants or the like. In other words, the selection unit 504 selects information that is within a range of the latitude and altitude to have been specified by a user. At that time, transmission history information stored in the transmission history storage unit 506 is retrieved, and if the selected information includes information that was already transmitted to the in-vehicle computer 20, the transmitted information is removed from the target information to be transmitted, which prevents duplicate transmission.

The transmission history storage unit 506 stores information that was transmitted to the in-vehicle computer 20 as well as a date of transmission thereof. By retrieving the transmission history storage unit 506 based on the selected information and the last update date, it is possible to determine whether or not the selected information was sent to the in-vehicle computer 20. The selection unit 504 requests the transmission unit 507 to transmit the selected information, and stores the transmitted information and the date of transmission thereof on the transmission history storage unit 506.

The transmission unit 507 transmits the selected additional information to the in-vehicle computer 20 in accordance with the assigned priority.

Figure 6:
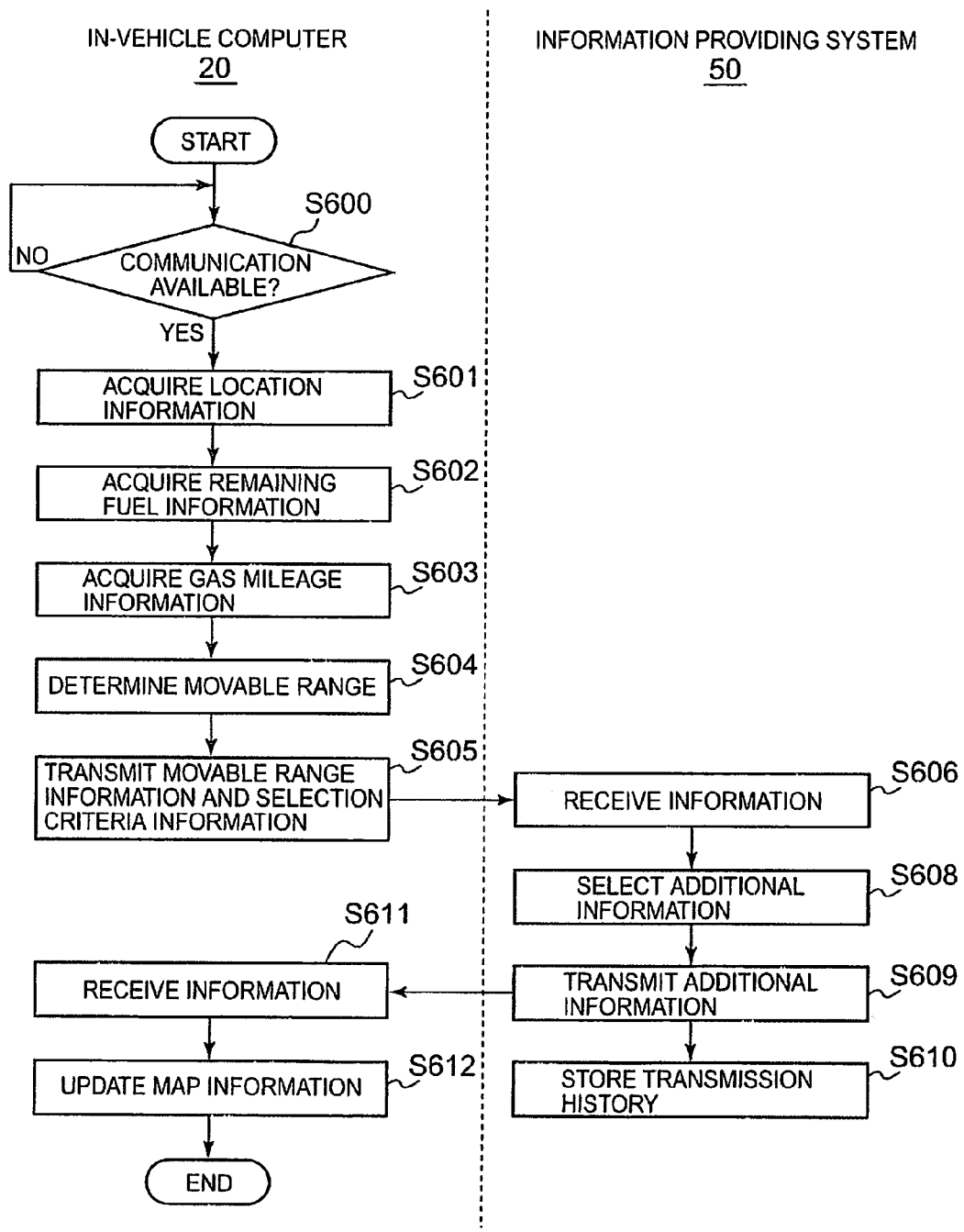
FIG. 6 shows a flowchart of processing in which the in-vehicle computer in the first embodiment of the present invention acquires additional information of map information from the information providing system.

FIG. 6 shows a flowchart of processing in which the in-vehicle computer 20 acquires additional information of map information from the information providing system 50, in the first embodiment of the present invention. The in-vehicle computer 20 determines whether or not the area is available for communication (S600). On condition that the area is not available for communication (S600: NO), the in-vehicle computer 20 repeatedly determines whether or not the area is available for communication on a regular basis. Meanwhile, on condition that the area is available for communication (S600: YES), the input unit 201 acquires location information of a vehicle (S601), remaining fuel information thereof (S602), gas mileage information (including gas mileage rate information) thereof (S603), respectively. In addition, the above information thereof can be acquired in any order or in parallel. In response to the acquisition of the location information of the vehicle, remaining fuel information thereof, and gas mileage information thereof, the determination unit 205 determines a movable range of the vehicle (S604). The request unit 204 receives information on the movable range from the determination unit 203, and also takes additional information selection criteria from the storage unit 202 to transmit the same to the information providing system 50 (S605).

In response to the fact that acquisition unit 501 receives the information on the movable range and additional information selection criteria from the in-vehicle computer 20 (S606), the selection unit 504 selects, from the additional information database 505, map data and spot information (additional information of map information) to be transmitted, based on the information received (S608). The transmission unit 507 transmits the selected additional information of map information to the in-vehicle computer 20 in accordance with the assigned priorities (S609), and stores the transmission history of the transmitted information (S610).

In response to the fact that the acquisition unit 205 of the in-vehicle computer 20 receives the additional information of map information from the information providing system 50 (S611), the update unit 206 updates the map information stored in the map information database 207 using the received additional information (S612).

Figure 7:
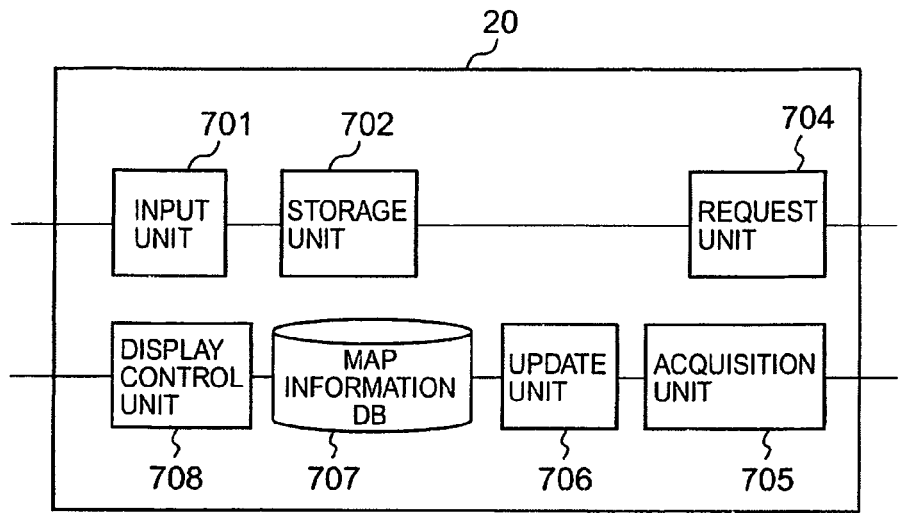
FIG. 7 shows functions of an in-vehicle computer in a second embodiment of the present invention, categorizing into function blocks.

FIG. 7 shows functions of an in-vehicle computer 20 in a second embodiment of the present invention, categorizing into function blocks. In FIG. 7, the in-vehicle computer 20 includes an inputs unit 701, a storage unit 702, a request unit 704, an acquisition unit 705, an update unit 706, a map information database 707, and a display control unit 708. A difference between the in-vehicle computer 20 in the second embodiment of FIG. 7 and the in-vehicle computer 20 in the first embodiment of FIG. 2 is that the in-vehicle computer 20 in the second embodiment of FIG. 7 does not include the determination unit 203 included in the in-vehicle computer 20 in the first embodiment of FIG. 2. In the second embodiment of FIG. 7, the in-vehicle computer 20 does not determine a movable range of a vehicle. In the present embodiment, the in-vehicle computer 20 transmits location information of a vehicle, remaining fuel information thereof, and gas mileage information thereof that were acquired by the input unit 701 as well as selection criteria that was taken from the storage unit 702, from the request unit 704 to the information providing system 50. The other constituents of the in-vehicle computer 20 in the second embodiment are similar to the constituents in the in-vehicle computer 20 in the first embodiment.

Figure 8:
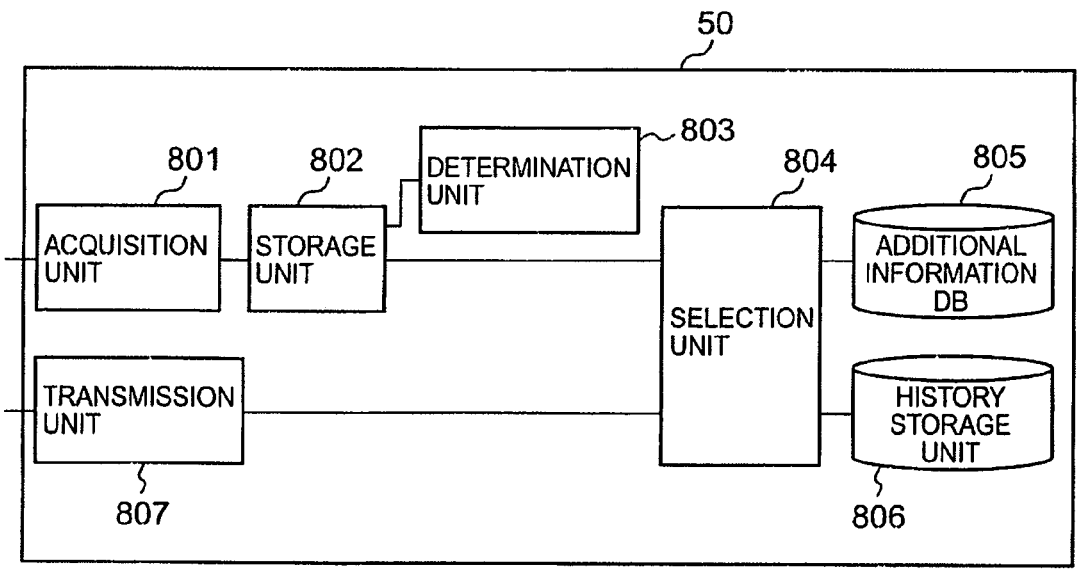
FIG. 8 shows functions of an information providing system in the second embodiment of the present invention, categorizing into function blocks.

FIG. 8 shows functions of an information providing system 50 in the second embodiment of the present invention, categorizing into function blocks. The information providing system 50 includes an acquisition unit 801, a storage unit 802, a determination unit 803, a selection unit 804, an additional information database 805, a transmission history storage unit 806, and a transmission unit 807. A difference between the information providing system 50 in the second embodiment of FIG. 8 and the information providing system 50 in the first embodiment of FIG. 5 is that the information providing system 50 in the second embodiment of FIG. 8 includes a determination unit 803 in addition to the constituents of the information providing system 50 in the first embodiment of FIG. 5. In the second embodiment of FIG. 8, the information providing system 50 determines a movable range of a vehicle. In the second embodiment of FIG. 8, the determination unit 803 in the information providing system 50 determines a movable range of a vehicle based on location information of a vehicle acquired by the acquisition unit 801. In case that remaining fuel information and gas mileage information are available, it is possible to determine a more highly accurate movable range of a vehicle by using the above information thereof. The other constituents of the information providing system 50 in the second embodiment are similar to those in the first embodiment.

Figure 9:
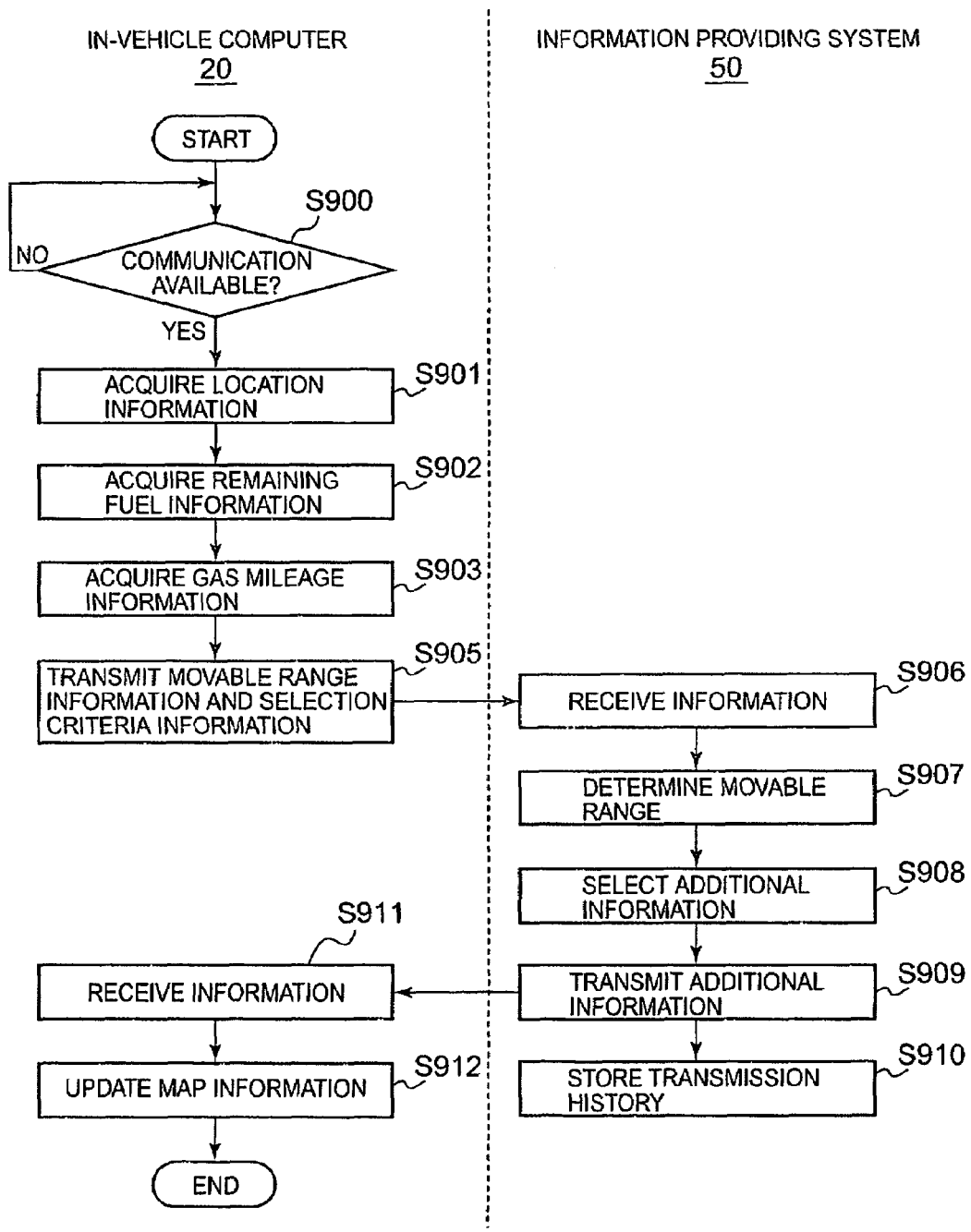
FIG. 9 shows a flowchart of processing in which the in-vehicle computer in the second embodiment of the present invention acquires additional information of map information from the information providing system.

FIG. 9 shows a flowchart of processing in which the in-vehicle computer 20 in the second embodiment of the present invention acquires additional information of map information from the information providing system 50. In the present embodiment, since the in-vehicle computer 20 does not determine a movable range of a vehicle, the request unit 704 takes location information of a vehicle, remaining fuel information thereof, gas mileage information thereof, and information of additional information selection criteria thereof from the storage unit 702, and transmits the same to the information providing system 50 (S905). In response to the fact that the acquisition unit 801 in the information providing system 50 receives location information and the like of a vehicle from the in-vehicle computer 20 (S906), the determination unit 803 determines a movable range of the vehicle based on the information (S907). The other steps in the flowchart in the present embodiment are similar to steps in information providing system 50 in the first embodiment. In particular, steps S900-S903 and S908-S912 of FIG. 9 are similar to steps S600-S603 and S608-S612 of FIG. 6, respectively.

Figure 10:
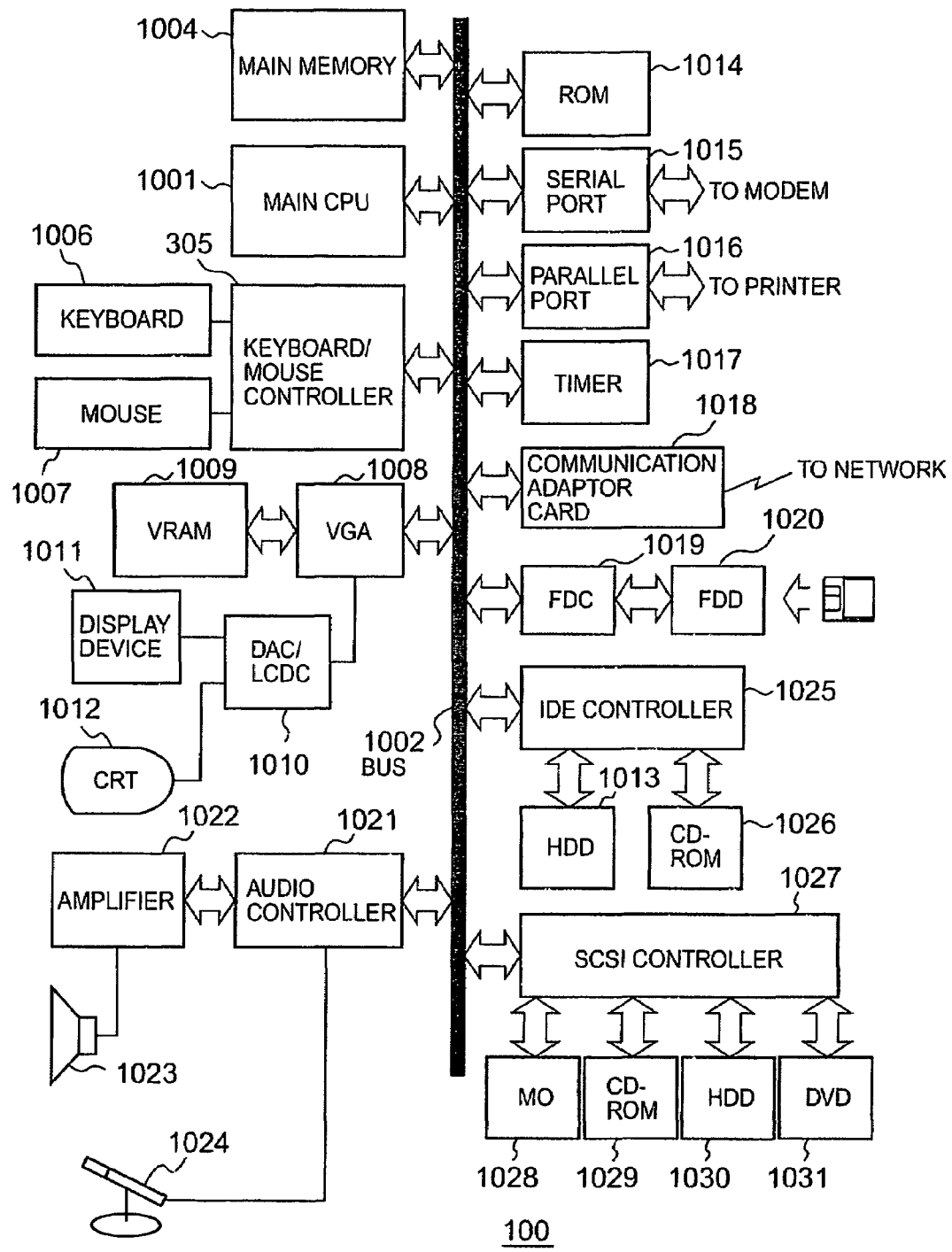
FIG. 10 shows an example of a hardware constitution of an information processing apparatus which functions as the in-vehicle computer or the information providing system, in accordance with embodiments of the present invention.

FIG. 10 shows an example of a constitution of hardware in an information processing apparatus 100 which works as the in-vehicle computer 20 or the information providing system 50, in accordance with embodiments of the present invention. The information processing apparatus 100 includes a CPU (central processing unit) 1001, and a main memory 1003, which are connected to a bus 1002. Removable storage devices (external storage systems where storage media can be changed), such as hard disk devices 1013 and 1030, CD-ROM devices 1026 and 1029, a flexible disk device 1020, a MO device 1028, a DVD-ROM device 1031, are connected to the bus 1002 via an IDE controller 1025, a SCSI controller 1027 or the like. For example, the hard disk devices 1013 and 1030 may function as the map information databases 207 and 707 shown in FIG. 2 and FIG. 7, the additional information databases 505 and 805, or the transmission history storage unit 506 and 806 shown in FIG. 5 and FIG. 8.

Computer usable storage media such as a flexible disk, an MO, a CD-ROM, and a DVD-ROM are inserted into removable storage. To these storage media, the hard disk devices 1013 and 1030, and the ROM 1014, it is possible to store a computer readable program code for executing the present invention, by supplying instructions to the CPU or the like in conjunction with an operating system. The computer program is executed by being loaded on the main memory 1004. It is also possible to compress the computer program or divide the same into multiple programs in order to store the same into a plurality of media. Since operations that the program causes the information processing apparatus 100 to execute are the same as the operations in the in-vehicle computer 20 and the information providing system 50 that are described in FIG. 1 to FIG. 9, the descriptions thereof will be omitted. Thus, a computer program product may comprise a computer usable medium having a computer readable program code embodied therein, wherein the computer readable program code contains instructions that when executed by a processor of the information processing apparatus 100 perform the method of the present invention.

The information processing apparatus receives the input from a user interface device such as a keyboard 1006 or a mouse 1007 via a keyboard/mouse controller 1005. The information processing apparatus 100 is connected to a display device 1011 for displaying visual data to a user via a DAC/LCDC 1010.

By being connected to a network via a network adaptor 1018 (an Ethernet(R) card or a token-ring card) or the like, the information processing apparatus can communicate with other computers or the like.

The above descriptions will enable to easily understand that the information processing apparatus 100 suitable for realizing the in-vehicle computer 20 or the information providing system 50 according to the embodiments of the present invention can be achieved by an information processing apparatus such as a main frame, a work station, a normal personal computer and the like, or combinations thereof. However, these constituents are mere examples, and all of these constituents are not necessarily essential to the present invention.

It is a matter of course that a person skilled in the art can easily suppose that it is possible to add, to each of the hardware constituents of the information processing apparatus 100 used in the embodiments of the present invention, various kinds of changes, such as by which a plurality of machines are combined and functions are allocated to those machines to be executed, etc. These changes are concepts to be naturally included in the idea of the present invention.

The present invention is described using the embodiments of the invention as stated above. However, the technical scope of the present invention is not limited to the scope described in these embodiments stated above. It is clear to a person skilled in the art that various kinds of changes or modifications can be added to the embodiments described above. It is also apparent from the scope of the claims that the changed or modified embodiments can also be included in the technical scope of the present invention.

What is claimed is:

1. A method for obtaining additional information pertaining to a route R along which a vehicle is traveling from a current location P to a destination D, said method comprising:

acquiring, by an in-vehicle computer positioned within the vehicle, location information of the vehicle, said location information comprising the current location P of the vehicle;

transmitting, by the in-vehicle computer to a server via a network, the location information, movable range information, and selection criteria information, wherein a movable range C derivable from the movable range information is an area relative to the current location P in which the vehicle can travel from the current location P by using a remaining amount of fuel in the vehicle when the vehicle is at the current location, wherein a limited range F with respect to the route R is a function of the location information, the movable range information, and the selection criteria information, and wherein the selection criteria information constrains the limited range F to be a subset of the movable range C that is less than the movable range C; and receiving, by the in-vehicle computer from the server, additional information limited to information concerning locations within the limited range F.

2. The method of claim 1, wherein the method further comprises acquiring, by the in-vehicle computer, remaining fuel information consisting of said remaining amount of fuel in the vehicle when the vehicle is at the current location;

acquiring, by the in-vehicle computer, gas milage rate information consisting of a gas milage rate for the vehicle;

computing, by the in-vehicle computer, the movable range C based on the location information, the remaining fuel information, and the gas milage rate information; and including the computed movable range C within the movable range information that is transmitted by the in-vehicle computer to the server.

3. The method of claim 1, wherein the method further comprises:

acquiring, by the in-vehicle computer, remaining fuel information consisting of said remaining amount of fuel in the vehicle when the vehicle is at the current location;

acquiring, by the in-vehicle computer, gas milage rate information consisting of a gas milage rate for the vehicle; and including the remaining fuel information and the gas milage rate information within the movable range information that is transmitted by the in-vehicle computer to the server, wherein the movable range C may be determined by the server from the location information, the remaining fuel information, and the gas milage rate information.

4. The method of claim 1, wherein the limited range F consists of a portion of the route R that is disposed between about the current location P and about the destination D.

5. The method of claim 4, wherein outermost boundaries B of the limited range F are displaced from the trajectory T of the vehicle along the route D by no more than a maximum distance S, and wherein the maximum distance S is determined by the selection criteria information.

6. The method of claim 1, wherein the selection criteria information comprises a plurality of information categories for the additional information and an assigned priority for each category, and wherein said receiving additional information comprises receiving the additional information in descending order with respect to said assigned priorities.

7. The method of claim 6, wherein each category is independently selected from the group consisting of high priority, medium priority, and low priority.

8. The method of claim 1, wherein the received additional information does not include other additional information previously received by the in-vehicle computer from the server before said receiving the additional information is performed.

9. A computer program product, comprising a computer usable medium having a computer readable program code embodied therein, said computer readable program code containing instructions that when executed by a processor of an information processing apparatus perform the method of claim 1, wherein the information processing apparatus consists of the in-vehicle computer.

10. An information processing apparatus comprising a processor adapted to execute computer readable program code to perform the method of claim 1, wherein the information processing apparatus consists of the in-vehicle computer, and wherein the in-vehicle computer comprises the processor.

11. A method for providing additional information pertaining to a route R along which a vehicle is traveling from a current location P to a destination D, said method comprising:

receiving, by a server from an in-vehicle computer via a network, location information of the vehicle, movable range information, and selection criteria information, wherein the in-vehicle computer is positioned within the vehicle, wherein the location information comprises the current location P of the vehicle, wherein a movable range C derivable from the movable range information is an area relative to the current location P in which the vehicle can travel from the current location P by using a remaining amount of fuel in the vehicle when the vehicle is at the current location;

determining a limited range F with respect to the route R, wherein said determining the limited range F comprises utilizing the location information, the movable range information, and the selection criteria, and wherein the selection criteria information constrains the limited range F to be a subset of the movable range C that is less than the movable range C; and transmitting, by the server to the in-vehicle computer, additional information limited to information concerning locations within the limited range F.

12. The method of claim 11, wherein the movable range information received by the server from the in-vehicle comprises the movable range C.

13. The method of claim 11, wherein the movable range information received by the server from the in-vehicle comprises remaining fuel information and gas milage rate information, wherein the remaining fuel information consists of said remaining amount of fuel in the vehicle when the vehicle is at the current location, wherein the gas milage rate information consists of a gas milage rate for the vehicle, and wherein the method further comprises computing, by the server, the movable range C based on the location information, the remaining fuel information, and the gas milage rate information.

14. The method of claim 11, wherein the limited range F consists of a portion of the route R that is disposed between about the current location P and about the destination D.

15. The method of claim 14, wherein outermost boundaries B of the limited range F are displaced from the trajectory T of the vehicle along the route D by no more than a maximum distance S, and wherein the maximum distance S is determined by the selection criteria information.

16. The method of claim 11, wherein the selection criteria information comprises a plurality of information categories for the additional information and an assigned priority for each category, and wherein said receiving additional information comprises receiving the additional information in descending order with respect to said assigned priorities.

17. The method of claim 16, wherein each category is independently selected from the group consisting of high priority, medium priority, and low priority.

18. The method of claim 11, wherein the transmitted additional information does not include other additional information previously transmitted by the server to the in-vehicle computer before said transmitting the additional information is performed.

19. A computer program product, comprising a computer usable medium having a computer readable program code embodied therein, said computer readable program code containing instructions that when executed by a processor of an information processing apparatus perform the method of claim 11, wherein the information processing apparatus consists of the server.

20. An information processing apparatus comprising a processor adapted to execute computer readable program code to perform the method of claim 11, wherein the information processing apparatus consists of the server, and wherein the server comprises the processor.

* * * * *